US012688182B1

(12) United States Patent　　　　　(10) Patent No.:　US 12,688,182 B1
Babilius et al.　　　　　　　　　　　(45) Date of Patent:　Jul. 21, 2026

(54) METHOD AND SYSTEM FOR ENSURING DATA CONSISTENCY ACROSS PARTITIONS IN TABLES WITH CROSS-PARTITION UPDATES

(71) Applicant: CAST AI Group, Inc., Miami, FL (US)

(72) Inventors: Povilas Babilius, Vilnius (LT); Laurynas Stasys, Vilnius (LT)

(73) Assignee: CAST AI Group, Inc., Miami, FL (US)

( * ) Notice: Subject to any disclaimer, the term of this patent is extended or adjusted under 35 U.S.C. 154(b) by 0 days.

(21) Appl. No.: 19/246,092

(22) Filed: Jun. 23, 2025

Related U.S. Application Data

(60) Provisional application No. 63/793,284, filed on Apr. 23, 2025.

(51) Int. Cl.
　　*G06F 16/23*　　　(2019.01)
　　*G06F 16/22*　　　(2019.01)
　　*G06F 16/27*　　　(2019.01)
(52) U.S. Cl.
　　CPC ...... *G06F 16/2365* (2019.01); *G06F 16/2282* (2019.01); *G06F 16/278* (2019.01)
(58) Field of Classification Search
　　CPC . G06F 16/2365; G06F 16/2282; G06F 16/278
　　See application file for complete search history.

(56) References Cited

U.S. PATENT DOCUMENTS

2004/0148293 A1* 7/2004 Croisettier .......... G06F 16/2272
2020/0320060 A1* 10/2020 Jung ................... G06F 16/2379
2021/0117437 A1* 4/2021 Gibson ................ G06F 16/258

FOREIGN PATENT DOCUMENTS

EP　　　　　1164511 A2 * 12/2001 ........... G06F 16/283

OTHER PUBLICATIONS

Achanta, Comparing Different Strategies for Handling Type 2 Slowing Changing Dimensions in Data Warehousing, pp. 1687-1695 (Year: 2022).*

* cited by examiner

*Primary Examiner* — Albert M Phillips, III
(74) *Attorney, Agent, or Firm* — Fenwick & West LLP

(57)　　　　　　ABSTRACT
A system and method for maintaining data consistency in partitioned database tables that store versioned data records. Each record includes a primary key, an effective end time, and a record update time. Records are partitioned based on their effective end times. When an update inserts a new version of a record with the same primary key but a different effective end time, the updated record may be placed in a different partition than the original. To ensure the outdated version is properly removed during partition-local background merge operations, the system generates and inserts a synthetic data record. The synthetic record has the same primary key and effective end time as the original record, but a later record update time, which triggers merge logic within the original partition to identify and remove the outdated record.

20 Claims, 8 Drawing Sheets

100

Data Warehouse
130

Data Engine
132

Database Tables
134

Network
150

Automation System
110

Cross-Partition
Consistency
Module
112

Client System(s)
120

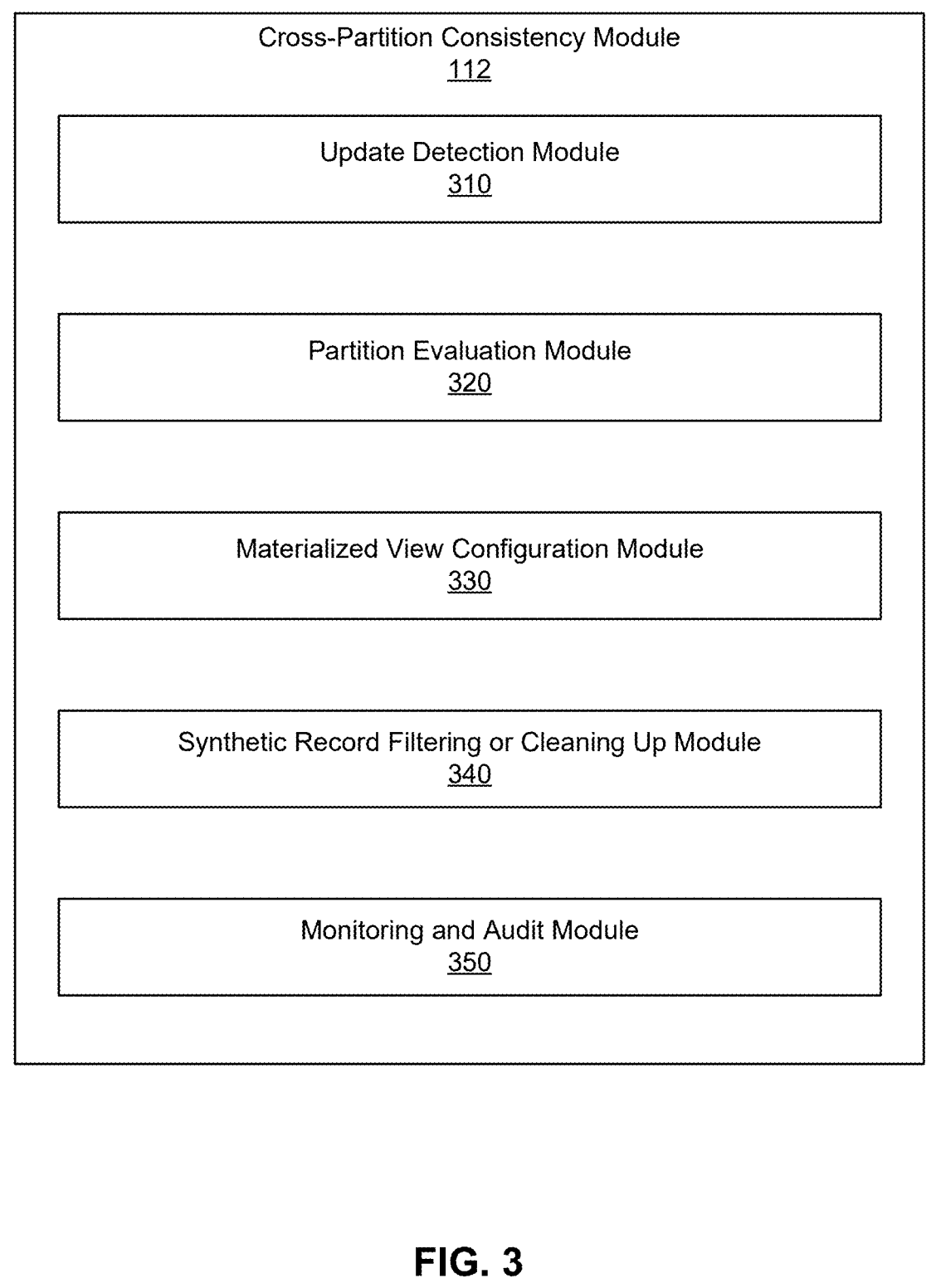

Cross-Partition Consistency Module
112

Update Detection Module
310

Partition Evaluation Module
320

Materialized View Configuration Module
330

Synthetic Record Filtering or Cleaning Up Module
340

Monitoring and Audit Module
350

FIG. 3

400A feature_store.
`raw_data.cluster_nodes`

410A

| id | value | efective_from | effective_to | cdc_updated_at | latest_value |
|---|---|---|---|---|---|
| deadbeaf-1337-4d52-a521-0a32229e84b9 | 100 | 2024-11-28 01:01:01 | 2038-01-19 04:14:07 | 2024-11-28 01:11:11 | 1 |

`raw_data.`cluster_nodes.mv`

420A raw_data.`cluster_nodes.local`

| id | value | efective_from | effective_to | cdc_updated_at | latest_value | _partition_id |
|---|---|---|---|---|---|---|
| deadbeaf-1337-4d52-a521-0a32229e84b9 | 100 | 2024-11-28 01:01:01 | 2038-01-19 04:14:07 | 2024-11-28 01:11:11 | 1 | 20380117 |

410B feature_store.`raw_data.cluster_nodes`

| id | value | efective_from | effective_to | cdc_updated_at | latest_value |
|---|---|---|---|---|---|
| deadbeaf-1337-4d52-a521-0a32229e84b9 | 100 | 2024-11-28 01:01:01 | 2038-01-19 04:14:07 | 2024-11-28 01:11:11 | 1 |
| deadbeaf-1337-4d52-a521-0a32229e84b9 | 100 | 2024-11-28 01:01:01 | 2024-12-05 02:02:02 | 2024-12-05 02:22:22 | 1 |
| deadbeaf-1337-4d52-a521-0a32229e84b9 | 200 | 2024-12-05 02:02:02 | 2038-01-19 04:14:07 | 2024-12-05 02:22:22 | 1 | raw__data.`cluster_nodes.force_merge_latest.m` raw_data.`cluster_nodes.mv` raw__data.`cluster_nodes.mv`

420B raw_data.`cluster_nodes.local`

| id | value | efective_from | effective_to | cdc_updated_at | latest_value | _partition_id |
|---|---|---|---|---|---|---|
| deadbeaf-1337-4d52-a521-0a32229e84b9 | 100 | 2024-11-28 01:01:01 | 2038-01-19 04:14:07 | 2024-11-28 01:11:11 | 1 | 20380117 |
| deadbeaf-1337-4d52-a521-0a32229e84b9 | 100 | 2024-11-28 01:01:01 | 2038-01-19 04:14:07 | 2038-01-19 04:14:07 | 0 | 20380117 |
| deadbeaf-1337-4d52-a521-0a32229e84b9 | 100 | 2024-11-28 01:01:01 | 2024-12-05 02:02:02 | 2024-12-05 02:22:22 | 0 | 20241201 |
| deadbeaf-1337-4d52-a521-0a32229e84b9 | 100 | 2024-12-05 02:02:02 | 2038-01-19 04:14:07 | 2024-12-05 02:22:22 | 1 | 20380117 |

400C feature_store.`raw_data.cluster_nodes`

410C

| id | value | efective_from | effective_to | cdc_updated_at | latest_value |
|---|---|---|---|---|---|
| deadbeaf-1337-4d52-a521-0a32229e84b9 | 100 | 2024-11-28 01:01:01 | 2038-01-19 04:14:07 | 2024-11-28 01:11:11 | 1 |
| deadbeaf-1337-4d52-a521-0a32229e84b9 | 100 | 2024-11-28 01:01:01 | 2024-12-05 02:02:02 | 2024-12-05 02:22:22 | 0 |
| deadbeaf-1337-4d52-a521-0a32229e84b9 | 200 | 2024-12-05 02:02:02 | 2038-01-19 04:14:07 | 2024-12-05 02:22:22 | 1 |
| deadbeaf-1337-4d52-a521-0a32229e84b9 | 200 | 2024-12-05 02:02:02 | 2042-12-12 03:03:03 | 2024-12-12 03:33:33 | 0 |
| deadbeaf-1337-4d52-a521-0a32229e84b9 | 300 | 2024-12-12 03:03:03 | 2038-01-19 04:14:07 | 2024-12-12 03:33:33 | 1 | raw_data.`cluster_nodes.force_merge_latest.mv`
raw_data.`cluster_nodes.mv`
raw_data.`cluster_nodes.mv`
raw_data.`cluster_nodes.local`

420C

| id | value | efective_from | effective_to | cdc_updated_at | latest_value | _partition_id |
|---|---|---|---|---|---|---|
| deadbeaf-1337-4d52-a521-0a32229e84b9 | 100 | 2024-11-28 01:01:01 | 2038-01-19 04:14:07 | 2024-11-28 01:11:11 | 1 | 20380117 |
| deadbeaf-1337-4d52-a521-0a32229e84b9 | 100 | 2024-11-28 01:01:01 | 2038-01-19 04:14:07 | 2038-01-19 04:14:07 | 0 | 20380117 |
| deadbeaf-1337-4d52-a521-0a32229e84b9 | 100 | 2024-11-28 01:01:01 | 2024-12-05 02:02:02 | 2024-12-05 02:22:22 | 0 | 20241201 |
| deadbeaf-1337-4d52-a521-0a32229e84b9 | 200 | 2024-12-05 02:02:02 | 2038-01-19 04:14:07 | 2024-12-05 02:22:22 | 1 | 20380117 |
| deadbeaf-1337-4d52-a521-0a32229e84b9 | 200 | 2024-12-05 02:02:02 | 2038-01-19 04:14:07 | 2038-12-12 04:14:07 | 0 | 20380117 |
| deadbeaf-1337-4d52-a521-0a32229e84b9 | 200 | 2024-12-05 02:02:02 | 2024-12-12 03:03:03 | 2024-12-12 03:33:33 | 0 | 20241208 |
| deadbeaf-1337-4d52-a521-0a32229e84b9 | 300 | 2024-12-12 03:03:03 | 2038-01-19 04:14:07 | 2024-12-12 03:33:33 | 1 | 20380117 |

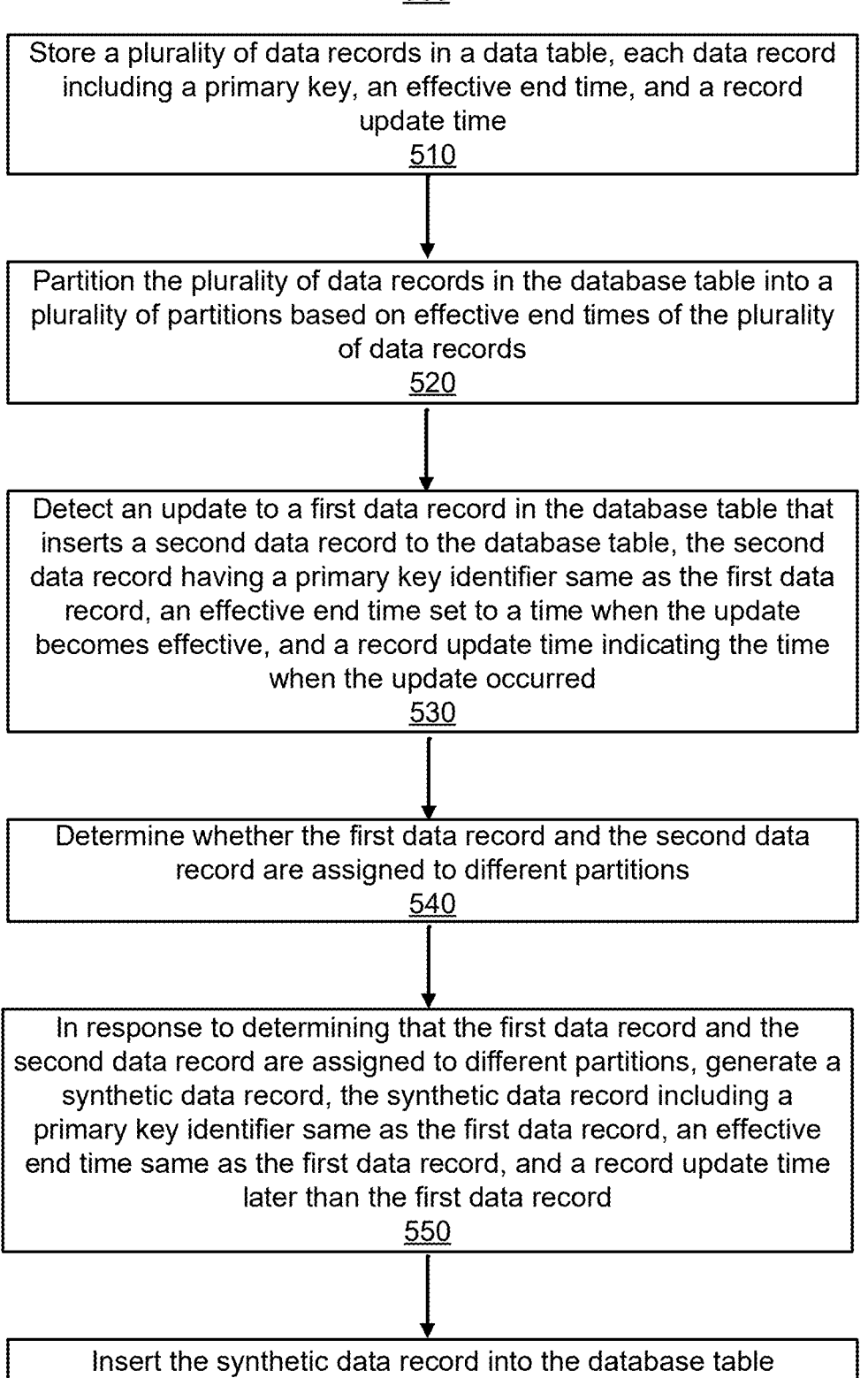

Store a plurality of data records in a data table, each data record including a primary key, an effective end time, and a record update time
510

Partition the plurality of data records in the database table into a plurality of partitions based on effective end times of the plurality of data records
520

Detect an update to a first data record in the database table that inserts a second data record to the database table, the second data record having a primary key identifier same as the first data record, an effective end time set to a time when the update becomes effective, and a record update time indicating the time when the update occurred
530

Determine whether the first data record and the second data record are assigned to different partitions
540

In response to determining that the first data record and the second data record are assigned to different partitions, generate a synthetic data record, the synthetic data record including a primary key identifier same as the first data record, an effective end time same as the first data record, and a record update time later than the first data record
550

Insert the synthetic data record into the database table
560

FIG. 5

METHOD AND SYSTEM FOR ENSURING DATA CONSISTENCY ACROSS PARTITIONS IN TABLES WITH CROSS-PARTITION UPDATES

CROSS-REFERENCE TO RELATED APPLICATION

This application claims the benefit of, and priority to, U.S. Provisional Patent Application No. 63/793,284, filed on Apr. 23, 2025, which is incorporated herein by reference in its entirety.

TECHNICAL FIELD

This disclosure relates generally to database management systems, and more specifically methods and systems for maintaining data consistency across partitions in tables with cross-partition updates.

BACKGROUND

Records in conventional database engines used for managing versioned temporal record schema, such as Slowly Changing Dimension (SCD) Type 2 schema, have a validity interval defined by "effective from" and "effective to" timestamps. A common partitioning strategy is to use the "effective to" timestamp to assign each record to a partition representing a specific time window (e.g., to YYYYMM (effective_to) to partition data monthly). When a record is updated, its "effective to" timestamp is modified to reflect an end of that version's validity. If this updated "effective to" falls into a different time window than the original, the updated record logically belongs to a different partition.

In such systems, background merge operations are limited to operating within individual partitions and lack visibility into records residing in other partitions. As a result, when an update modifies an effective end time of a record such that it belongs to a new partition, the original version may remain orphaned in its initial partition. This can lead to the accumulation of outdated records that are never removed by background processes, producing incorrect results during analytical queries and undermining the integrity of historical data.

SUMMARY

This disclosure addresses the aforementioned problem by detecting updates that result in a record transitioning across partitions and, in response, inserting synthetic records into the original partition. These synthetic records enable background merge operations within the database engine to identify and eliminate the outdated versions of records, thereby ensuring data consistency across partitions.

A system stores multiple data records in a database table. Each data record includes a primary key, an effective end time, and a record update time. The database table is partitioned based on the effective end times of the records to optimize query performance and support historical tracking, such as for Slowly Changing Dimension (SCD) Type 2 data.

When an update is detected that introduces a new version of an existing record, the system determines whether the updated record is placed in a different partition from the original. If so, the system generates a synthetic data record with the same primary key and effective end time as the original record, but with a later record update time. This synthetic record, inserted into the original partition, triggers partition-local merge logic to remove the outdated record without requiring cross-partition operations.

In some embodiments, the update includes inserting a third record that reflects the currently valid version, marked by a far-future effective end time and a latest indicator set to true. The outdated and synthetic records have their latest indicators set to false.

In some embodiments, to facilitate background merges, the system compares record update times for each primary key and retains only the most recent record. In some embodiments, each record also includes a partition identifier derived from its effective end time, grouping records into time-windowed partitions.

In some embodiments, materialized views are used to detect update events and generate synthetic records automatically. To ensure synthetic records do not interfere with query results, their record update times may be set to a predefined marker timestamp. Queries are modified to exclude records with this marker value, preserving the integrity and correctness of analytical results.

BRIEF DESCRIPTION OF THE DRAWINGS

Figure (FIG. 1 is a block diagram of a system environment in which an automation system may be implemented, in accordance with one or more embodiments.

FIG. 3 illustrates an example architecture of a cross-partition consistency module, in accordance with one or more embodiments.

FIG. 4A illustrates an example initial state of a database table stored in a data warehouse (which may correspond to the database table stored in the data ware house of FIG. 1) implementing version temporal record schema, in accordance with one or more embodiments.

FIG. 4B illustrates an example state of a database table stored in a data warehouse following an update operation that results in cross-partition record distribution, in accordance with one or more embodiments.

FIG. 4C illustrates another example state of a database table stored in the data warehouse after subsequent update operations, in accordance with one or more embodiments.

FIG. 5 is a flowchart of a method for cross-partition record management, in accordance with one or more embodiments.

Figure 1:
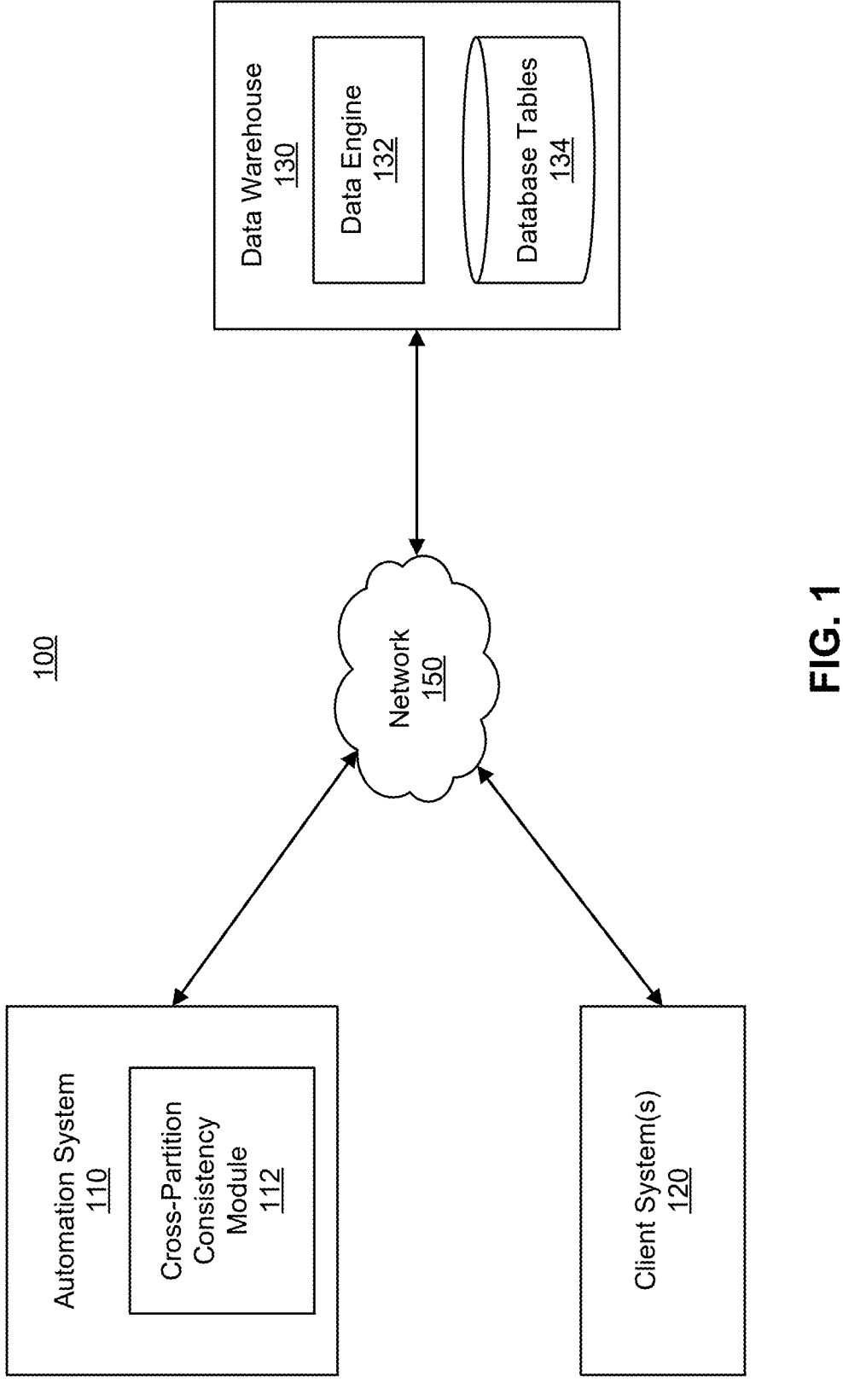

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Columnar database management systems, such as ClickHouse™, utilize versioned temporal record schemas to track data attribute changes over time in analytics and data warehousing applications. Slowly Changing Dimensions Type 2 (SCD Type 2) schema represents one such versioned temporal record schema that records historical changes by appending new records with updated attribute values rather than overwriting existing records. Each record typically includes a primary key identifier, tracked attribute values, an effective start timestamp (effective_from), and an effective end timestamp (effective_to) defining the record version's validity period.

A technical challenge arises when employing data engines (such as MergeTree engines, or ReplacingMergeTree engines) with effective_to-based partitioning in versioned temporal record updates. When an existing record is updated, the original record's effective_to timestamp is modified to indicate validity termination, while a new record is inserted with updated attribute values and a far-future effective_to timestamp. This update process can cause the original and new records to belong to different partitions based on their respective effective_to timestamps.

Because the background merge operations are partition-local, operating only within individual partitions, outdated original records remain physically stored in their initial partitions while new records reside in different partitions. This partition-local limitation prevents automatic cleanup of outdated records during background merges, creating data integrity issues where obsolete records persist and can cause query inaccuracies.

Consider a versioned data record stored within a partitioned database table that employs time-based partitioning using the effective_to timestamp. An original record having an effective_to value of "2038 Jan. 19 04:14:07" is assigned to partition "20380117" corresponding to the far-future date. Upon an SCD Type 2 update event, the system appends a second record with an effective_to value modified to "2024 Dec. 5 02:02:02", causing this record to be logically assigned to partition "20241201" based on the temporal partitioning function. Additionally, a third record is created with an effective_from timestamp of "2024 Dec. 5 02:02:02" and an effective_to value restored to the far-future date "2038 Jan. 19 04:14:07", placing it back in partition "20380117". This update pattern causes the logical validity intervals of the record versions to span across multiple temporal partitions, resulting in cross-partition distribution where the original record remains physically stored in partition "20380117" while the intermediate terminated record logically belongs to partition "20241201". As such, the original record becomes an obsolete version that persists in its original partition location, which cannot be automatically cleaned up by partition-local background merge operations and may cause analytical queries to include stale data.

The embodiments described herein address the above described problem by implementing an automation system configured to detect updates that logically relocate outdated record versions to different partitions. In response to detecting such an update, the system generates a synthetic record that facilitates the data engine's background merge logic in identifying and removing the outdated record during merge operations. Additional details about the system are further described below with respect to FIGS. 1-5.

System Architecture

FIG. 1 is a block diagram of a system environment 100 in which an automation system 110 (also referred to "the system") may be implemented in accordance with one or more embodiments. The environment 100 includes the automation system 110, one or more client devices 120, and one or more data warehouse(s) 130, interconnected via a network 150.

The data warehouse 130 is a data storage system that stores database tables 134. The data warehouse 130 includes a data engine 132 configured to manage the stored database tables 134. To optimize query performance on large-scale tables, the data engine 132 applies partitioning, which may be on temporal attributes such as the month or week derived from the effective_to timestamp or other attributes. This partitioning scheme enables efficient query pruning by restricting scans to relevant partitions filtered by time ranges.

In some embodiments, to maintain efficient storage and query performance, the data engine 132 is also configured to perform background merge operations that combine smaller data parts into larger ones. This merging process reduces data fragmentation, minimizes storage overhead, and enables fast data retrieval by pruning irrelevant partitions based on query predicates.

In some embodiments, the data engine 132 is a MergeTree data engine. The MergeTree data engine 132 is configured to handle append-only data with efficient support for read and write operations in analytical workloads. Variants of the MergeTree engine 132 include mechanisms to handle data versioning and deduplication. For example, ClickHouse™ employs a ReplacingMergeTree engine. The ReplacingMergeTree engine extends the base MergeTree by incorporating a versioning column, which enables automatic deduplication of records during merges based on the highest version value per primary key. In some embodiments, the row with the highest version value is retained while obsolete rows are removed, with these merges occurring within individual data parts or partitions.

For example, consider a partition of a database table 134 that contains multiple small data parts resulting from recent insertions or updates. These small data parts individually store subsets of records with overlapping primary keys. The data engine 132 may perform background merge process periodically that consolidates these smaller data parts into a single larger data part. During this merge, the data engine 132 compares records sharing the same primary key within a same partition and, depending on the merge engine's rules (such as versioning or deduplication logic), retains only the most recent or relevant record while discarding duplicates or obsolete versions within the same partition.

As described above, a technical challenge arises when an existing record is updated such that: the original record's effective_to timestamp is modified to indicate the end of its validity (for example, set to the current timestamp now( )_; and a new record is inserted with a new attribute value, a new effective_from timestamp (e.g., now( )), and typically a "far-future" effective_to timestamp denoting it as the current version. The update may cause the original record to logically belong to a different partition than the newly inserted record based on their respective effective_to timestamps.

Because the background merge operations are partition-local, operating only within individual partitions, outdated original records remain physically stored in their initial partitions while new records reside in different partitions. This partition-local limitation prevents automatic cleanup of outdated records during background merges, creating data integrity issues where obsolete records persist and can cause query inaccuracies.

The automation system 110 is configured to address this challenge. As illustrated, the automation system 110 includes a cross-partition consistency module 112 configured to monitor and manage updates to data records stored within the data warehouse 130. The cross-partition consistency module 112 is configured to detect when an update to a data record causes a logical change that spans multiple partitions, such as when a record's effective validity period is modified to fall into a different partition than its original partition. In response to detecting such cross-partition updates, the cross-partition consistency module 112 initiates corrective actions to ensure data consistency by coordinating the insertion of synthetic records or markers within the affected partitions. These synthetic records facilitate the background merge processes of the underlying data engine 132 to correctly identify and remove outdated or superseded records that otherwise would remain orphaned in their original partitions.

The output of the cross-partition consistency module 112 includes a consistent, de-duplicated dataset, which may be stored back at the data warehouse 130 and/or made available to downstream applications within the automation system 110 for a variety of analytical and operational purposes. Such downstream applications can leverage the output to generate accurate reports, support historical data analysis, enable time-travel queries reflecting correct data states at given points in time, and drive machine learning models that rely on clean, temporally consistent data. Additional details about the cross-partition consistency module 112 are further described below with respect to FIGS. 2-5.

The client device(s) 120 are computing systems associated with various entities. These entities include entities that can issue queries, submit data requests, or receive notifications related to data consistency and availability. The client device(s) 120 may rely on the consistent and up-to-date data managed by the automation system 110 to perform various tasks such as data analysis, reporting, visualization, or further processing within other applications. The client device(s) 120 may include user interfaces, analytical tools, or automated services that require access to historical and current data spanning multiple partitions, which may be stored in database tables 134 of the data warehouse 130.

The client devices 120 are also capable of receiving user input as well as transmitting and/or receiving data via the network 150. In one embodiment, a client device 120 is a computer system, such as a desktop or a laptop computer. Alternatively, a client device 120 may be a device having computer functionality, such as a personal digital assistant (PDA), a mobile telephone, a smartphone, or another suitable device. A client device 120 is configured to communicate via the network 150. In one embodiment, a client device 120 executes an application allowing a user of the client device 120 to interact with the automation system 110. For example, the client device 120 may execute a customer mobile application to enable interaction between the client device 120 and the automation system 110 or the data warehouse 130. As another example, a client device 120 executes a browser application to enable interaction between the client device 120 and the system 110 via the network 150. In another embodiment, a client device 120 interacts with the system 110 through an application programming interface (API) running on a native operating system of the client device 120, such as IOS® or ANDROID™.

The network 150 is configured to facilitate communications among the automation system 110, client device 120, and data warehouse 130. The network 150 may comprise any combination of local area and/or wide area networks, using both wired and/or wireless communication systems. In one embodiment, the network 150 uses standard communications technologies and/or protocols. For example, the network 150 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 150 include multiprotocol label switching (MPLS), transmission control protocol/Internet protocol (TCP/IP), hypertext transport protocol (HTTP), simple mail transfer protocol (SMTP), and file transfer protocol (FTP).

Data exchanged over the network 150 may be represented using any suitable format, such as hypertext markup language (HTML) or extensible markup language (XML). In some embodiments, all or some of the communication links of the network 150 may be encrypted using any suitable technique or techniques.

Example Architecture of Data Engine

Figure 2:
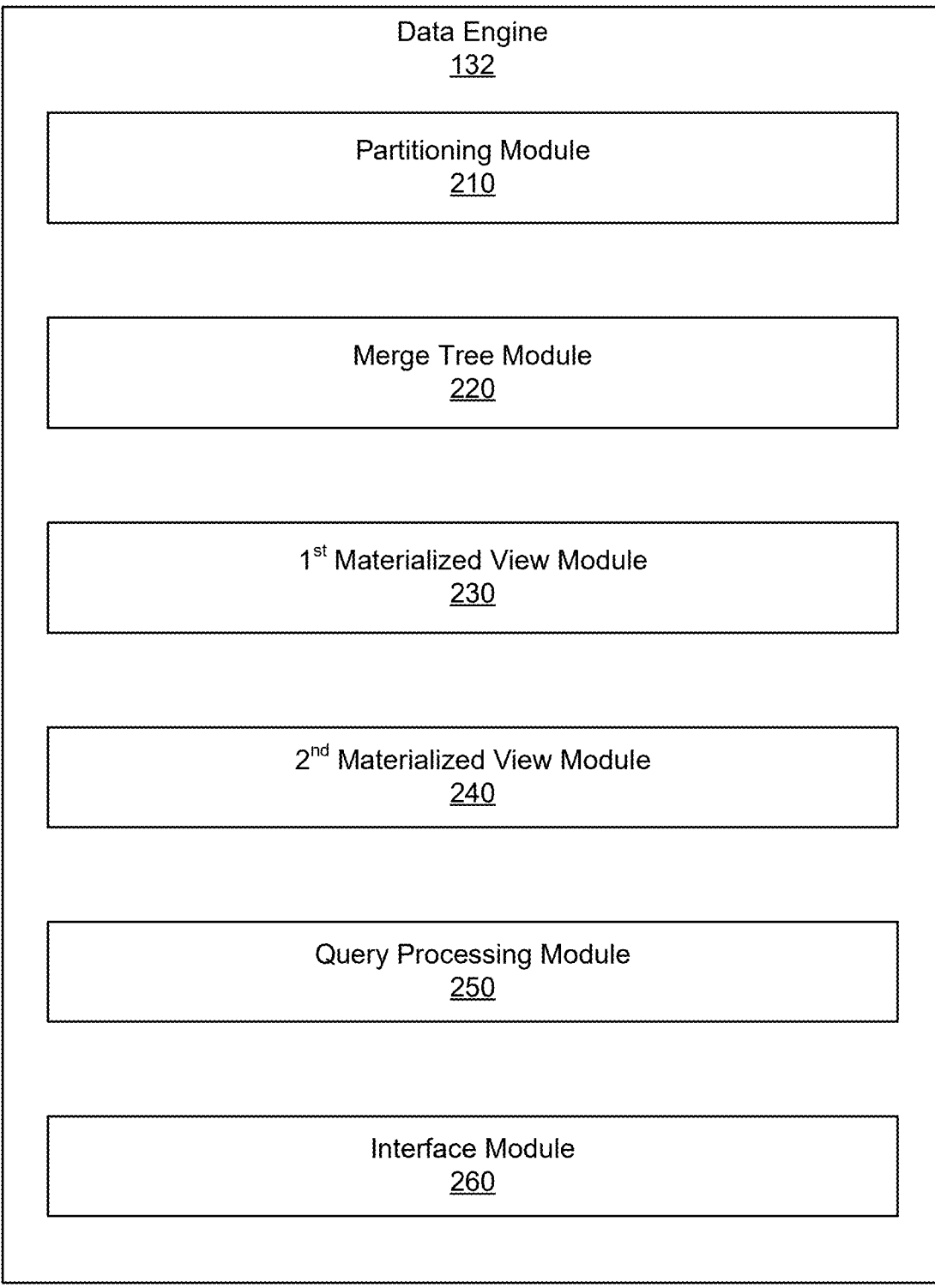
FIG. 2 illustrates an example architecture of a data engine, in accordance with one or more embodiments.

FIG. 2 illustrates an example architecture of a data engine 132, in accordance with one or more embodiments. The data engine 132 includes a partitioning module 210, a merge tree module 220, a first materialized view module 230, a second materialized view module 230, a query processing module 250, and an interface module 260. In some embodiments, the data engine 132 may include more or fewer modules than those depicted in FIG. 2. Additionally, the functionalities of multiple modules may be integrated into a single module, or conversely, the functions of a single module may be distributed across multiple modules.

The partitioning module 210 is configured to manage distribution of data records in the database table 134 across multiple partitions. In some embodiments, the distribution of data records is based on temporal attributes derived from the effective_to timestamps of versioned records. In some embodiments, the partitioning module 210 implements a partitioning scheme that applies a temporal partitioning function, such as to YYYYMMDD(toStartOfWeek(effective_to)), to evaluate effective end times and generate partition identifiers that determine the physical storage location of each record. The partitioning module 210 may include a partition key evaluator that processes the effective_to values and calculates corresponding partition assignments, ensuring that records with similar temporal characteristics are co-located within the same partition for efficient query pruning and data access patterns.

When new records are inserted, the partitioning module 210 determines whether records should be assigned to different partitions by comparing their respective effective_to timestamps and the resulting partition key values. The partitioning module 210 also facilitates query optimization by enabling partition pruning, where irrelevant partitions can be excluded from query execution based on temporal predicates, thereby improving overall system performance and reducing unnecessary data scanning operations.

The merge tree module 220 may correspond to a Replacing MergeTree engine. The merge tree module 220 is configured to manage data storage and background merge operations within a partitioned database table 134. In some embodiments, merge tree module 210 uses a versioning column, such as cdc_updated_at timestamp, to determine which records to retain during merge operations when duplicate records with identical primary keys are encountered within a same partition.

During background merge processes, the module compares records having matching primary key identifiers comprising the id and effective_from fields, and eliminates outdated records based on version column comparisons. The merge tree module 210 operates in a partition-local manner, meaning that merge operations are confined to individual partitions and cannot automatically remove duplicate records that span across different partitions. This partition-local limitation necessitates the synthetic record mechanism implemented by other modules to enable proper cleanup of outdated records when SCD Type 2 updates cause record versions to be distributed across multiple partitions. The module also maintains sparse primary indexes and handles data compression to optimize storage utilization and query response times.

The first materialized view module 230 implements a data replication mechanism (e.g., a first materialized view named raw_data.cluster_nodes.mv) that handles basic ingestion and SCD Type 2 record creation between source and target tables. A materialized view is a database object that contains the results of a query and physically stores that data. Materialized views can be configured to automatically refresh their stored data when the underlying source tables change.

The first materialized view module 230 implements the first materialized view that monitors changes in the source table (e.g., a source table named feature_store.raw_data-.cluster_nodes) and automatically replicates data modifications to the partitioned target table (e.g., a target table named raw_data.cluster_nodes.local) using pre-configured materialized view logic. The first materialized view module 230 may be configured to process standard SCD Type 2 operations by creating new record versions with latest_value indicators set to true for current records and updating previous versions to have latest_value indicators set to false when records are superseded.

In some embodiments, the first materialized view module 230 also handles the data synchronization requirements by selecting rows from the source table, potentially filtering out deletions marked by source mechanisms, and inserting them into the target table with appropriate partition assignments based on their effective_to timestamps. The first materialized view module 230 operates continuously to maintain data consistency between source and target systems, ensuring that all record changes, including attribute value updates and temporal validity modifications, are properly reflected in the partitioned database structure.

The second materialized view module 240 implements the automated synthetic record generation mechanism (e.g., a second materialized view named raw_data.cluster_nodes-.force_merge_latest.mv) that addresses cross-partition record cleanup challenges in SCD Type 2 implementations. This second materialized view module 240 implements the second materialized view that continuously monitors the source table to detect specific update patterns where existing records with far-future effective_to timestamps (indicating current versions) are modified to have concrete effective_to dates (indicating termination of validity). When such updates are detected, the second materialized view module 240 automatically triggers synthetic record generation targeting the original partition location of the updated record.

In some embodiments, a generated synthetic record contain the same primary key identifier and effective_start_time as the original record, but includes a special marker timestamp (e.g., a far future timestamp, 2038 Jan. 19 04:14:07) in the cdc_updated_at field that serves as a version indicator for the ReplacingMergeTree background merge operations. The second materialized view module 240 implements trigger condition logic that identifies when source rows mark previous versions as no longer latest (latest_value=0) and set new effective_to values, indicating that cross-partition record distribution has occurred. By inserting synthetic records into the original partition where outdated records physically reside, this module enables the merge tree module 220's partition-local background merge operations to properly identify and eliminate obsolete record versions that would otherwise persist indefinitely due to the partition boundary limitations of standard ReplacingMergeTree behavior.

The query processing module 250 manages query execution across the partitioned database system while ensuring data consistency and proper handling of synthetic records generated by the materialized view modules. The query processing module 250 implements various query processing capabilities including SQL parsing, query plan optimization, and distributed query execution across multiple partitions containing versioned temporal records.

For example, the query processing module 250 supports cross-partition querying capabilities that allow retrieval of both current records with far-future effective_to timestamps and historical records with effective_to dates dated in the past, spanning multiple partitions as needed to provide complete temporal data coverage. In some embodiments, the query processing module 250 may also implement partition pruning optimization techniques that eliminate irrelevant partitions from query execution plans based on temporal predicates, thereby improving query performance and reducing unnecessary data access. In some embodiments, this query processing module 250 may coordinate with the merge tree module to ensure that query results reflect the most current state of data after background merge operations have eliminated outdated records through the synthetic record mechanism.

In some embodiments, the query processing module 250 may incorporate specialized filtering logic to exclude synthetic helper records from query results by automatically applying filter conditions that check for the special marker timestamp (e.g., 2038 Jan. 19 04:14:07) in the cdc_updated_at field. This filtering mechanism enables end users to receive accurate query results containing only actual data records while the synthetic records continue to serve their technical purpose of enabling cross-partition cleanup operations. In some embodiments, the filtering mechanism is implemented within the query processing module 250 of the data engine. Alternatively, the filtering mechanism is implemented at the automation system 110, which modifies originally receive queries to include a filter function.

The interface module 260 provides external connectivity and API endpoints that enable client applications, database administrators, and other system components to interact with the data engine 132 and access the versioned temporal record management capabilities. In some embodiments, the interface module 260 implements standardized database interfaces including SQL query interfaces, administrative interfaces, and programmatic APIs that support various client connection protocols and authentication mechanisms. In some embodiments, the interface module 260 may also handle client request routing, session management, and result set formatting to ensure integration with existing database client applications and analytics tools. In some embodiments, the interface module 260 may also provide monitoring and diagnostic capabilities that allow administrators to observe the operation of the synthetic record generation mechanism, track background merge operations, and verify the proper functioning of cross-partition cleanup processes.

In some embodiments, the interface module 260 may also support configuration management functions that enable database administrators to modify partitioning schemes, adjust materialized view trigger conditions, and customize the special marker timestamps used in synthetic record generation. In some embodiments, the interface module 260 may implement logging and auditing capabilities that track SCD Type 2 update operations, synthetic record insertions, and background merge activities to provide comprehensive visibility into the automated record lifecycle management processes. The interface module 260 ensures that the advanced cross-partition cleanup capabilities provided by the disclosed invention are accessible through standard database interfaces while maintaining compatibility with existing database management tools and client applications that rely on conventional SQL query mechanisms.

Example Architecture of Cross-Partition Consistency Module

FIG. 3 illustrates an example architecture of a cross-partition consistency module 112, in accordance with one or more embodiments. The cross-partition consistency module 112 includes an update detection module 310, a partition evaluation module 320, materialized view configuration module 330, a synthetic record filtering or cleanup module 340, and a monitoring and audit module 350. In some embodiments, the cross-partition consistency module 112 may include more or fewer modules than those depicted in FIG. 3. Additionally, the functionalities of multiple modules may be integrated into a single module, or conversely, the functions of a single module may be distributed across multiple modules.

The update detection module 310 is configured to monitor a source data for updates to the source data stream. The source data may be stored at the data warehouse 130 and confirm to a versioned temporal record schema, such as the SCD type 2 schema. Rather than overwriting existing data when an attribute value changes, a new versioned record is created for each change, thereby enabling point-in-time analysis and historical auditing. Each record typically includes a unique identifier (e.g., id), a set of descriptive attributes (e.g., value), an effective_from timestamp indicating when the version became valid, and an effective_to timestamp marking when it ceased to be valid.

The most recent version of a record may also be marked with a flag such as latest_value=1, and may use a far-future effective-to value (e.g., Jan. 19, 2038) to signify that it is currently active. In response to detecting an update operation that modifies the effective_to field of an existing record, the update detection module 310 identifies the affected primary key and captures both the original and new record states. The update detection module 210 may be implemented using a materialized view, a database trigger, or a change data capture mechanism.

The partition evaluation module 320 is configured to determine whether an update operation has caused a logical record to move from one partition to another. In some embodiments, the partition evaluation module 320 receives metadata regarding an original and updated versions of a data record, including an effective end times. In some embodiments, the determination is performed by computing partition identifiers, e.g., using a transformation such as to YYYYMM(effective_to) before and after the update. In response to determining that the identifiers differ, the partition evaluation module 320 determines that the update as a cross-partition transition.

The materialized view configuration module 330 is configured to define materialized views that enable automated cross-partition record cleanup in versioned temporal database systems. The materialized view configuration module 330 may provide an administrative interface and configuration management capabilities that allow users (such as database administrators) to define, modify, and deploy materialized view logic for both primary data replication and synthetic record generation operations. The materialized view configuration module 330 manages the configuration parameters for the first materialized view (raw_data.cluster_nodes.mv) including source table specifications, target table mappings, replication filtering criteria, and SCD Type 2 record creation rules that govern how latest_value indicators are assigned during standard data synchronization processes.

Additionally, the materialized view configuration module 330 also handles the more complex configuration requirements for the second materialized view (e.g., a materialized view named raw_data.cluster_nodes.force_merge_latest.mv) by defining the trigger condition logic that detects cross-partition update scenarios, specifying the synthetic record generation templates, and establishing the special marker timestamp values used in cdc_updated_at fields for enabling background merge operations. The materialized view configuration module 330 may also provide validation capabilities to ensure that materialized view definitions are syntactically correct and logically consistent with the underlying table schemas and partitioning schemes.

Furthermore, in some embodiments, this materialized view configuration module 330 may also support version control and deployment management for materialized view configurations, allowing administrators to test changes in development environments before deploying updated logic to production systems, thereby ensuring reliable operation of the automated cross-partition cleanup mechanisms essential to maintaining data integrity in SCD Type 2 implementations.

The synthetic record filtering or cleanup module 340 is configured to automatically identify and exclude synthetic records from query results. In some embodiments, the synthetic record filtering or cleanup module 340 may implement a filtering logic that recognizes synthetic records based on their distinctive cdc_updated_at timestamps, such as the predetermined special marker timestamp value of 2038 Jan. 19 04:14:07, and applies appropriate exclusion criteria during query processing operations. In some embodiments, the synthetic record filtering module 340 may intercept SQL queries directed at the partitioned database table and automatically injects WHERE clause conditions that specify cdc_updated_at!=SPECIAL_MARKER to ensure that synthetic records do not appear in user-facing query results.

In some embodiments, the synthetic record filtering or cleanup module 340 maintains a registry of special marker timestamps and can accommodate multiple marker values if different synthetic record types are implemented for various cleanup scenarios. The synthetic record filtering module 340 may also provide query optimization capabilities by coordinating with the query processing module 250 of the data engine 132 to ensure that synthetic record filtering does not adversely impact query performance, particularly in scenarios involving cross-partition queries that span multiple temporal ranges. Additionally, this synthetic record filtering or cleanup module 340 may also support administrative override capabilities that allow database administrators to intentionally include synthetic records in query results for diagnostic and troubleshooting purposes when analyzing the operation of the automated cleanup mechanisms.

In some embodiments, the synthetic record filtering or cleanup module 340 may also be configured to purge synthetic records from the data table 134 in response to determining that their role in triggering background merges has been fulfilled. In some embodiments, the purge or cleanup may operate on a scheduled basis, identifying synthetic records using their unique version indicator and confirming that the corresponding outdated records have been successfully removed. In response to successful validation, the synthetic record filtering or cleanup module 340 may issue delete operations against the synthetic record to free up storage and minimize clutter. As such, the system's long term data footprint is minimized and that synthetic records are ephemeral in nature, serving only as transitional artifacts.

The monitoring and audit module 350 is configured to provide visibility into internal operations of the cross-partition consistency module 112 by tracking update events, synthetic record insertions, and partition merge outcomes. The monitoring and audit module 260 may maintain logs or metrics indicating which records were subject to cross-partition updates, which partitions currently contain synthetic records, and whether merge processes have completed successfully. In some embodiment, the monitoring and audit module 350 facilitates system auditing, debugging, and health checks, enabling operations to verify the consistency is being maintained and to detect anomalies or failure modes that may require manual remediation.

Example Data Records in Data Tables

FIG. 4A illustrates an example initial state of a database table 400A stored in a data warehouse (which may correspond to the database table 134 stored in the data warehouse 130 of FIG. 1) implementing version temporal record schema, in accordance with one or more embodiments. As illustrated in FIG. 4A, a source table 410A (feature_store.raw_data.cluster_nodes) contains a single record with identifier "deadbeef-1337-4d52-a521-da3222be84b9" having a value of 100, an effective_from timestamp of "2024 Nov. 28 01:01:01", an effective_to timestamp of "2038 Jan. 19 04:14:07" representing a far-future date, a cdc_updated_at timestamp of "2024 Nov. 28 01:11:11" representing the time when the update occurred, and a latest_value flag set to 1 indicating that the record is the current version.

A data engine (which may correspond to the data engine 132 of FIG. 1) replicates this source record in a target table 420A (raw_data.cluster_nodes.local) via a first materialized view (raw_data.cluster_nodes.mv). This refresh may be triggered when source data changes (e.g., real-time), on a scheduled basis (e.g., batch updates), or on-demand when explicitly refreshed (e.g., in response to certain events).

The target table 420A maintains identical field values while additionally including a _partition_id field with value "20380117" derived from the effective_to timestamp. This partitioning scheme shows a temporal-based partition scheme where records are assigned to partitions based on their effective_to dates, with the partition identifier corresponding to the date portion of the far-future timestamp.

FIG. 4B illustrates an example state of a database table 400B stored in a data warehouse following an update operation that results in cross-partition record distribution, in accordance with one or more embodiments. As described above, under a partitioned versioned table schema, when a data record is to be updated, new versions of the record are generated and inserted into the data table. For example, when a first record (i.e., original record) is updated, a second record and a third record are generated. The second record (corresponding to the second row of the source table) has a primary key identifier same as the first record, an effective start time same as the first record, an effective end time set to a current time indicating termination of validity of the first record, and a record update time indicating when the update occurred. The third record (corresponding to the third row of the source table) has a primary key identifier same as the first record, an effective start time set to the current time, an effective end time set to a far-future time indicating current validity, and a record update time indicating when the update occurred.

As such, a source table 410B (feature_store.raw_data.cluster_nodes) now contains three records for the same primary key identifier "deadbeef-1337-4d52-a521-da3222be84b9": (1) the original record with value=100 having its effective_to timestamp modified from the far-future date to "2024 Dec. 5 02:02:02" and latest_value indicator changed to 0, indicating termination of its validity period; (2) a second record with identical primary key and effective_from values but with value=100, effective_to set to "2024 Dec. 5 02:02:02", and latest_value=0; and (3) a third record representing the new current version with value=200, effective_from timestamp "2024 Dec. 5 02:02:02", effective_to timestamp "2038 Jan. 19 04:14:07", and latest_value=1.

A target table 420B (raw_data.cluster_nodes.local) reflects these changes through materialized view replication, resulting in cross-partition record distribution. In particular, the first record and the second record have different partition IDs, indicating that they are assigned to different partitions. The data engine automatically detects this cross-partition scenario through the second materialized view. (raw_data.cluster_nodes.force_merge_latest.mv) and generates a synthetic record 422B inserted into the data table (which corresponds to the second row in the target table 420B). The synthetic record 422B contains the same primary key identifier and effective_from timestamp ("2024 Nov. 28 01:01:01") as the original record but includes a distinctive cdc_updated_at timestamp of "2038 Jan. 19 04:14:07" that serves as a special marker for triggering background merge operations.

Notably, the synthetic record 422B is assigned to the same partition "20380117" as the first record based on their identical effective end times. Consequently, during background merge operations, the data engine can identify both records as having matching primary keys within the same partition and remove the original record based on version comparison using their respective record update times.

Further, the synthetic record 422B has a special marker timestamp, which enables the automation system 110 to identify and filter out the synthetic record during query or cleanup operations.

FIG. 4C illustrates another example state of a database table 400C stored in the data warehouse after subsequent update operations, in accordance with one or more embodiments. A data record may be modified multiple times. Similar to the process described with respect to FIG. 4B, each time, the data record is updated, two new data records are generated and inserted into the data table.

As illustrated in FIG. 4C, a source table 410C (feature_store.raw_data.cluster_nodes) now contains five records for the same primary key identifier "deadbeef-1337-4d52-a521-da3222be84b9", representing the complete evolution of record versions through multiple SCD Type 2 updates. The record progression includes: (1) the original record with value=100 and effective_to "2024 Dec. 5 02:02:02" (latest_value-0); (2) a second record with value=100 maintaining the same temporal boundaries; (3) an intermediate record with value=200 having its effective_to timestamp modified from the far-future date to "2024 Dec. 12 03:03:03" and latest_value changed to 0, indicating termination of its validity period; (4) a fourth record with value=200 reflecting the terminated state; and (5) a new current record with value=300, effective_from "2024 Dec. 12 03:03:03", effective_to "2038 Jan. 19 04:14:07", and latest_value=1.

The target table 420C (raw_data.cluster_nodes.local) demonstrates the cumulative effect of sequential SCD Type 2 updates through the first materialized view replication, resulting in a multi-partition record distribution. Similar to the process described with respect to FIG. 4B, data engine duplicates these records in a target table 420C via a first materialized view and assigns a partition to each record based on their effective_to timestamp. The resulting partitions indicate that the intermediate record 422C (corresponding to the fourth row in the target table 420C) and the fifth row 426C (one of the new records) are assigned to different partitions.

The data engine detects the cross-partition update through the second materialized view (raw_data.cluster_ nodes.force_merge_latest.mv) and generates an additional synthetic record 424C (which corresponds to the fifth row of the target table 420C). This synthetic record 424C contains the primary key identifier, effective_from timestamp "2024 Dec. 5 02:02:02" corresponding to the intermediate record's original state, and the distinctive cdc_updated_at timestamp "2038 Jan. 19 04:14:07" that serves as the special marker for enabling background merge cleanup operations.

Notably, the synthetic record 424C is assigned to the same partition "20380117" as the intermediate record 422C based on their matching effective end times and primary key components. Consequently, during background merge operations, the data engine can identify both records within the same partition boundary and remove the obsolete intermediate record 422C based on version comparison using their respective record update times.

Further, similar to the synthetic record 422B described with respect to FIG. 4B, the synthetic record 424C also has a special marker timestamp, which enables the automation system 110 to identify and filter out the synthetic record during query or cleanup operations.

The processes described with reference to FIGS. 4A-4C illustrate example scenarios involving a first and second update to an exemplary data record. One of ordinary skill in the art will appreciate that similar processes may be applied to other data records in the database table and may also recur with respect to the same data record in response to subsequent updates. Each such update may result in the insertion of new data records and the corresponding generation of synthetic data records. The presence of these synthetic records enables background merge operations to identify and remove obsolete records from their respective partitions, thereby preserving data consistency across partition boundaries.

Example Methods for Cross-Partition Record Management

FIG. 5 is a flowchart of a method 500 for cross-partition record management, in accordance with one or more embodiments. In various embodiments, the method includes different or additional steps than those described in conjunction with FIG. 5. Further, in some embodiments, the steps of the method may be performed in different orders than the order described in conjunction with FIG. 5. The method described in conjunction with FIG. 5 may be carried out by a system, such as the automation system 110, the data warehouse 130, or a combination of the automation system 110 and the data warehouse 130, in various embodiments.

The system stores 510 a plurality of data records in a database table. Each data record includes a primary key, effective end time, and a record update time. The primary key uniquely identifies an entity being tracked. The effective end time is a timestamp that specifies when the record version expires or is superseded. The record update time is a timestamp that captures when the record was last modified or inserted into the database table. In some embodiments, the database table may use a columnar storage architecture optimized for analytical workloads and large-scale data processing operations. In some embodiments, the database table may support SCD Type 2 or similar schema where historical changes are preserved through inserting new records rather than in-place updates.

The system partitions 520 the plurality of data records in the database table into a plurality of partitions based on effective end times of the plurality of records. The partitioning step 520 may be carried out by the partitioning module 210 of the data engine 132. In some embodiments, the system may apply a temporal partitioning function to the effective end time timestamps, such as to YYYYMMDD (toStartOfWeek(effective_to)), that evaluates the temporal values and generates corresponding partition identifiers based on derived date components including year, month, and day values. Records having effective end times that evaluate to the same partition key value are physically co-located within the same partition, while records with different effective end time evaluations are distributed across separate partitions.

This temporal partitioning strategy enables efficient query pruning operations where database queries can eliminate irrelevant partitions from consideration based on temporal predicates and date range filters, thereby reducing data scanning overhead and improving query response times. The partitioning mechanism may also facilitate partition-local background merge operations within individual partitions, supporting data compression, storage optimization, and maintenance tasks that operate independently across the distributed partition architecture. Far-future effective end times, such as 2038 Jan. 19 04:14:07, cause current record versions to be assigned to designated future partitions, enabling clear separation between active and historical data segments.

The system detects 530 an update to a first data record in the database table. In some embodiments, the detecting step 530 may be performed by the first materialized view module 230 of data engine 132, which may be configured by the materialized view configuration module 330 of the cross-partition consistency module 112. The update inserts a second data record to the database table. The second data record has a primary key identifier same as the first data record, an effective start time same as the first data record, an effective end time set to a time when the update becomes effective, and a record update time indicating the time when the update occurred. Note, the effective end time and the record update time may or may not coincide, depending on whether the change is intended to take effect immediately upon the update of the record.

In some embodiments, the update further includes inserting a third data record to the database table. The third data record has a primary key identifier same as the first data record, an effective start time set to a time when the update becomes effective, an effective end time set to a far-future time indicating current validity, and a record update time set to the time when the updated occurred.

Referring back to FIG. 4B, in the source table 410B, the first row corresponds to the first data record, the second row corresponds to the second data record, and the third row corresponds to the third data record. The system may configure a first materialized view to duplicate records of the source table in a target table 420B. In the target table 420B, the first row corresponds to the first record, the third row corresponds to the second record, and the fourth row corresponds to the third record.

The system determines 540 whether the first data record and the second data record are assigned to different partitions based on their respective effective end times. In some embodiments, this determining step 540 may be performed by the second materialized view module 240 of data engine 132, which may be configured by the materialized view configuration module 330. Referring back to FIG. 4B, in some embodiments, each data record in the target table 420B includes a partition identifier indicating an assigned partition of a corresponding data record. As illustrated, in the target table 420B, the first row and the fourth row are both assigned a partition ID 20380117 (corresponding to its effective_to date of 2038 Jan. 19), while the third row is assigned a partition ID 20241201 (corresponding to its effective_to date of 2024 Dec. 5). The system may configure the second materialized view (raw_data.cluster_nodes.force_merge_latest.mv) that determines whether the first record and the second record are assigned to different partitions. Notably, here, the first record and the second record are assigned to different partitions with different partition IDs, indicating that the first record and the second record are assigned to different partitions.

In response to determining that the first data record and the second data record are assigned to different partitions, the system generates 550 a synthetic data record. In some embodiments, the synthetic generation step 550 may also be performed by the second materialized view module 240. The synthetic data record includes a primary key identifier same as the first data record, an effective start time same as the first data record, an effective end time same as the first data record, and a record update time later than the first data record.

The system inserts 560 the synthetic data record into the data table. The synthetic data record and the first data record are assigned to a same partition based on their same effective end times, and the record update time of the synthetic data record being later than the first data record causes a background merge operation to identify and remove the first data record during partition-local merge operations.

In some embodiments, the record update time of the synthetic data record is set to a predetermined special marker timestamp, such as a far future time, which enables the system to filter synthetic data records out when performing query operations. In response to receiving a query targeting the database table, the system is configured to modify the query by appending a filter condition that excludes synthetic data records identified by a predefined marker in the record update timestamp. The modified query is then transmitted to a data engine associated with the database table, causing the data engine to execute the query while excluding the synthetic records from the result set.

As illustrated in FIG. 4B, in some embodiments, each data record further includes a latest value indicator indicating whether a corresponding data record is a latest data record. The latest value indicator of the second data record is set to false, and the latest value indicator of the synthetic data record is set to false, and the latest value indicator of the third data record is set to true. When a new record version is created, the previous record's latest value indicator is updated from true to false, indicating that it no longer represents the current state, while the newly inserted record receives a latest value indicator set to true, designating it as the current active version. This indicator update process ensures that exactly one record per primary key identifier maintains a latest value indicator of true at any given time, thereby preserving referential integrity and enabling reliable current-state query operations.

The above-described process represents a single iteration of the automated cross-partition cleanup mechanism. This process may continue iteratively for subsequent updates, with each update cycle triggering the same automated detection, synthetic record generation, and background merge cleanup sequence regardless of the number of previous iterations or the complexity of temporal boundaries involved. The repeatable nature of the process ensures consistent data integrity maintenance and storage optimization across extended operational periods, enabling the system to handle continuous SCD Type 2 update workflows without accumulating obsolete records or degrading query performance over time.

Example Computing System

Figure 6:
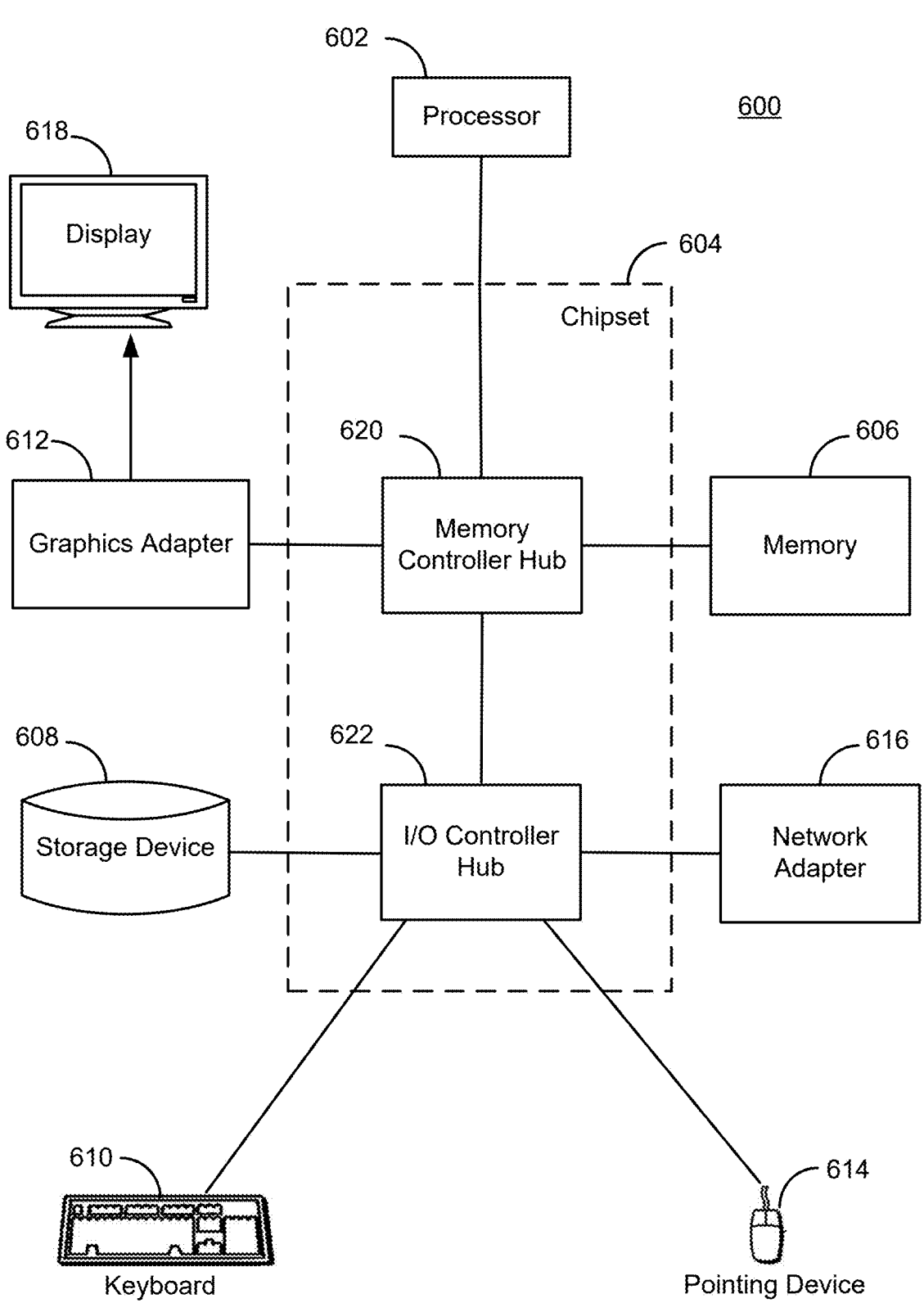
FIG. 6 is a block diagram of an example computer suitable for use in the networked computing environment.

FIG. 6 is a block diagram of an example computer 600 suitable for use in the networked computing environment 100 of FIG. 1. The computer 600 is a computer system and is configured to perform specific functions as described herein. For example, the specific functions corresponding to automation system 110 may be configured through the computer 600.

The example computer 600 includes a processor system having one or more processors 602 coupled to a chipset 604. The chipset 604 includes a memory controller hub 620 and an input/output (I/O) controller hub 622. A memory system having one or more memories 606 and a graphics adapter 612 are coupled to the memory controller hub 620, and a display 618 is coupled to the graphics adapter 612. A storage device 608, keyboard 610, pointing device 614, and network adapter 616 are coupled to the I/O controller hub 622. Other embodiments of the computer 600 have different architectures.

In the embodiment shown in FIG. 6, the storage device 608 is a non-transitory computer-readable storage medium such as a hard drive, compact disk read-only memory (CD-ROM), DVD, or a solid-state memory device. The memory 606 holds instructions and data used by the processor 602. The pointing device 614 is a mouse, track ball, touchscreen, or other types of a pointing device and may be used in combination with the keyboard 610 (which may be an on-screen keyboard) to input data into the computer 600. The graphics adapter 612 displays images and other information on the display 618. The network adapter 616 couples the computer 600 to one or more computer networks, such as network 150.

The types of computers used by the entities and the automation system 110 of FIGS. 1 through 5 can vary depending upon the embodiment and the processing power required by the enterprise. For example, the automation system 110 might include multiple blade servers working together to provide the functionality described. Furthermore, the computers can lack some of the components described above, such as keyboards 610, graphics adapters 612, and displays 618.

Additional Considerations

The disclosed embodiments provide technical improvements over conventional data engines in partitioned database systems by solving the fundamental cross-partition record cleanup problem. In particular, traditional data engines are inherently limited by their partition-local merge operations, which prevent automatic removal of outdated records when updates cause original and updated record versions to reside in different partitions based on their respective effective end times. The synthetic record generation mechanism disclosed herein overcomes this architectural limitation by automatically inserting strategically configured synthetic records that enable background merge operations to identify and eliminate obsolete records within their original partition boundaries, thereby restoring the intended deduplication functionality of the data engine across partition boundaries.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcodes, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer-readable storage medium, which includes any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for cross-partition database table management, comprising:

storing a plurality of data records in a database table, each data record including a primary key, an effective end time, and a record update time;

partitioning the plurality of data records in the database table into a plurality of partitions based on effective end times of the plurality of data records;

detecting an update to a first data record in the database table that inserts a second data record to the database table, the second data record having:

a primary key identifier same as the first data record, an effective end time set to a time when the update becomes effective, and a record update time indicating the time when the update occurred;

determining whether the first data record and the second data record are assigned to different partitions based on their respective effective end times;

in response to determining that the first data record and the second data record are assigned to different partitions, generating a synthetic data record, the synthetic data record including:

a primary key identifier same as the first data record, an effective end time same as the first data record, and a record update time later than the first data record; and inserting the synthetic data record into the database table, wherein the synthetic data record and the first data record are assigned to a same partition based on their same effective end times and same primary key identifier, and the record update time of the synthetic data record being later than the first data record causes a background merge operation to identify and remove the first data record during partition-local merge operations.

2. The method of claim 1, wherein the update further inserts a third data record to the database table, the third data record having:

a primary key identifier same as the first data record, an effective start time set to a time when the update becomes effective, an effective end time set to a far-future time indicating current validity, and a record update time set to the time when the update occurred.

3. The method of claim 2, wherein each data record further includes a latest value indicator indicating whether a corresponding data record is a latest data record, wherein the latest value indicator of the second data record is set to false, the latest value indicator of the synthetic data record is set to false, and the latest value indicator of the third data record is set to true.

4. The method of claim 1, further comprising:

performing a background merge operation based on record update times of data records, comprising, for a plurality of data records associated with a same primary key identifier:

identifying a data record with a latest record update time; and deleting a remaining data record that has an earlier record update time.

5. The method of claim 1, wherein each data record further includes a partition identifier indicating an assigned partition of a corresponding data record.

6. The method of claim 5, wherein for each data record, a value of a corresponding partition identifier is derived based on a corresponding effective end time, and data records with effective end times within a predetermined time window are assigned to a same partition identifier.

7. The method of claim 1, wherein detecting the update comprises monitoring data insertion operations through a first pre-configured materialized view.

8. The method of claim 7, wherein in response to detecting the update via the first pre-configured materialized view, a second pre-configured materialized view generates the synthetic data record.

9. The method of claim 1, wherein the record update time of the synthetic data record is set to a predetermined special marker timestamp.

10. The method of claim 9, the method further comprising:
   receiving a query against the database table;
   modifying the query against the database table by including a filter condition to exclude synthetic data records based on the predetermined special marker timestamp in the record update time.

11. A non-transitory computer readable storage medium having instructions encoded thereon that, when executed by one or more processors, cause the one or more processors to perform steps comprising:
   storing a plurality of data records in a database table, each data record including a primary key, an effective end time, and a record update time;
   partitioning the plurality of data records in the database table into a plurality of partitions based on effective end times of the plurality of data records;
   detecting an update to a first data record in the database table that inserts a second data record to the database table, the second data record having:
      a primary key identifier same as the first data record,
      an effective end time set to a time when the update becomes effective, and
      a record update time indicating the time when the update occurred;
   determining whether the first data record and the second data record are assigned to different partitions based on their respective effective end times;
   in response to determining that the first data record and the second data record are assigned to different partitions,
      generating a synthetic data record, the synthetic data record including:
         a primary key identifier same as the first data record,
         an effective end time same as the first data record, and
         a record update time later than the first data record; and
      inserting the synthetic data record into the database table, wherein the synthetic data record and the first data record are assigned to a same partition based on their same effective end times and same primary key identifier, and the record update time of the synthetic data record being later than the first data record causes a background merge operation to identify and remove the first data record during partition-local merge operations.

12. The non-transitory computer readable storage medium of claim 11, wherein the update further inserts a third data record to the database table, the third data record having:
   a primary key identifier same as the first data record,
   an effective start time set to a time when the update becomes effective, an effective end time set to a far-future time indicating current validity, and
   a record update time set to the time when the update occurred.

13. The non-transitory computer readable storage medium of claim 12, wherein each data record further includes a latest value indicator indicating whether a corresponding data record is a latest data record,
   wherein the latest value indicator of the second data record is set to false, the latest value indicator of the synthetic data record is set to false, and the latest value indicator of the third data record is set to true.

14. The non-transitory computer readable storage medium of claim 11, the steps further comprising:
   performing a background merge operation based on record update times of data records, comprising: for a plurality of data records associated with a same primary key identifier,
   identifying a data record with a latest record update time; and
   deleting a remaining data record that has an earlier record update time.

15. The non-transitory computer readable storage medium of claim 11, wherein each data record further includes a partition identifier indicating an assigned partition of a corresponding data record.

16. The non-transitory computer readable storage medium of claim 15, wherein for each data record, a value of a corresponding partition identifier is derived based on a corresponding effective end time, and data records with effective end times within a predetermined time window are assigned to a same partition identifier.

17. The non-transitory computer readable storage medium of claim 11, wherein detecting the update comprises monitoring data insertion operations through a first pre-configured materialized view.

18. The non-transitory computer readable storage medium of claim 17, wherein in response to detecting the update via the first pre-configured materialized view, a second pre-configured materialized view generates the synthetic data record.

19. The non-transitory computer readable storage medium of claim 11, wherein the record update time of the synthetic data record is set to a predetermined special marker timestamp, and the steps further comprises:
   receiving a query against the database table;
   modifying the query against the database table by including a filter condition to exclude synthetic data records based on the predetermined special marker timestamp in the record update time.

20. A system, comprising:
   one or more processors; and
   a non-transitory computer readable storage medium having instructions encoded thereon that, when executed by the one or more processors, cause the one or more processors to perform steps comprising:
      storing a plurality of data records in a database table, each data record including a primary key, an effective end time, and a record update time;
      partitioning the plurality of data records in the database table into a plurality of partitions based on effective end times of the plurality of data records;
      detecting an update to a first data record in the database table that inserts a second data record to the database table, the second data record having:
         a primary key identifier same as the first data record, an effective end time set to a time when the update becomes effective, and a record update time indicating the time when the update occurred;

determining whether the first data record and the second data record are assigned to different partitions based on their respective effective end times;

in response to determining that the first data record and the second data record are assigned to different partitions, generating a synthetic data record, the synthetic data record including:

a primary key identifier same as the first data record, an effective end time same as the first data record, and a record update time later than the first data record; and inserting the synthetic data record into the database table, wherein the synthetic data record and the first data record are assigned to a same partition based on their same effective end times and same primary key identifier, and the record update time of the synthetic data record being later than the first data record causes a background merge operation to identify and remove the first data record during partition-local merge operations.

\* \* \* \* \*